Patented July 27, 1926.

1,594,178

UNITED STATES PATENT OFFICE.

HANS KÜHL, OF BERLIN-LICHTERFELDE, GERMANY, ASSIGNOR TO ALBERT T. OTTO & SONS, OF NEW YORK, N. Y., A CORPORATION OF NEW YORK.

CEMENT AND PROCESS OF MAKING THE SAME.

No Drawing. Application filed February 19, 1925, Serial No. 10,205, and in Germany March 31, 1924.

It is known that the initial setting of Portland cement is better the more alumina the Portland cement contains and therefore, it is obvious that in order to obtain special cement of high initial strength one may increase the alumina content of the Portland cement beyond the percentage usually employed. Many experiments have been made in this regard, but they have come to naught on account of the fact that cements like Portland cement, high in alumina, become quick-setting in case the silica modulus, i. e., the ratio of silica to the sum total of the alumina and iron oxid, drops below a value which may be assumed at about 1.8.

Inasmuch as the amount of alumina in the Portland cement is as a rule about twice as high as the amount of iron oxid, a cement made in accordance with former processes and high in alumina with respect to its main constituents, has about the following composition:

| | Per cent. |
|---|---|
| Silica | 20 to 21 |
| Alumina | 7 to 8 |
| Iron oxid | 3 to 4 |
| Lime | 65 to 67 |

I have discovered that cement of this kind can be given a specially high initial strength, and that it is even possible to increase the alumina content without fear of quick-setting. I accomplish this by increasing the iron oxid content in the mixture and in the cement beyond the ratio usually employed.

Cements have formerly been produced which were made rich in iron oxid in order to obtain exceptionally high resistance against sea water, but in such cements the increase of the iron oxid content was made at the expense of the alumina, while the content of silica remained unchanged, or was even increased somewhat. Such cements high in iron as made by former methods, are therefore very poor in alumina, and have the following composition:

| | Per cent. |
|---|---|
| Silica | 22 to 23 |
| Alumina | 1 to 2 |
| Iron oxid | 8 to 9 |
| Lime | 64 to 66 |

The cement forming my invention is radically different from former Portland cement rich in alumina, and is also radically different from former cements rich in iron oxid, in that it is rich in both alumina and iron oxid, and accordingly the content of silica is correspondingly lower, preferably not over 19%.

A cement made in accordance with my invention may have for instance about the following chemical composition:

| | Per cent. |
|---|---|
| Silica | 14 to 18 |
| Alumina | 6 to 10 |
| Iron oxid | 5 to 10 |
| Lime | 60 to 65 |

Obviously the foregoing analysis does not give the absolute limits for the several ingredients of my new composition, but the new composition is better defined in respect to former cements by the fact that in the same the ratio of silica to alumina plus iron oxid is less than 1.8; that the ratio of alumina to iron oxid is less than 1.8, and that the ratio of iron oxid to alumina is less than 1.8.

The hydraulic modulus, namely, the ratio of lime to the sum total of the silica, alumina and iron oxid, should be more than 1.7, and is preferably more than 1.8. A cement having these requirements has not been manufactured prior to my invention so far as I know, and it has an exceptionally high initial strength, but without objectionable quick-setting.

It is preferable that the three first-mentioned ratios be kept below 1.65, and even better results are accomplished if the ratios be below 1.45.

As an example, a cement manufactured by me and embodying my present invention had the following composition, so far as concerns its main constituents:

| | Per cent. |
|---|---|
| Silica | 16.9 |
| Alumina | 8.2 |
| Iron oxid | 7.1 |
| Lime | 65.3 |

It will be noted that in this cement the ratios are as follows:

Lime to silica, alumina and iron oxid =2.03.
Silica to alumina and iron oxid=1.10.
Alumina to iron oxid=1.16.
Iron oxid to alumina=.87.

This cement, in which it will appear that all of the four ratios were within the prescribed limits, was mixed in the proportion of 1 part cement to 3 parts standard German sand, and the following data obtained expressed in kilos per square centimeter.

|  | 2 days. | 3 days. | 7 days. |
| --- | --- | --- | --- |
| Tensile strength, water setting | 29.0 | 29.6 | 31.5 |
| Tensile strength, air setting | 29.3 | 30.9 | 33.3 |
| Compression strength, water setting | 258 | 411 | 482 |
| Compression strength, air setting | 236 | 396 | 477 |

Cements of the required composition may be obtained if one takes as a basis certain raw materials rich in alumina and iron oxid, as for instance generator slag, blast furnace slag, siliceous bauxites, roasted pyrites, siliceous iron ores, etc., or the percentage of silica in ordinary Portland cement may be reduced by addition thereto of the aforementioned substances to such extents that the product complies with the aforementioned proportions with regard to silica, alumina and iron oxid. Obviously the lime content of such cements may be corrected in accordance with the well known rules of Portland cement manufacture.

The burning is effeted in the same manner as is customary in connection with the manufacture of Portland cement, but a material advantage results from the fact that my improved cement sinters comparatively easily, and that therefore considerably less fuel is required than in the manufacture of common Portland cement.

Having thus described my invention, what I claim as new and desire to secure by Letters Patent is:—

1. A sintered cement having silica, alumina, and iron oxid within the following limits, ratio of silica to alumina and iron oxid, less than 1.8, ratio of alumina to iron oxid less than 1.8, and ratio of iron oxid to alumina less than 1.8 the percentage of silica being not over 19%.

2. A sintered cement having silica, alumina, and iron oxid within the following limits, ratio of silica to alumina and iron oxid, less than 1.45, ratio of alumina to iron oxid, less than 1.45, and ratio of iron oxid to alumina less than 1.45.

3. A sintered cement having approximately the following composition, silica 14 to 18%, alumina 6 to 10%, iron oxid 5 to 10%, and lime 60 to 65%.

4. A sintered cement having high initial strength, and including silica, alumina and iron oxid, the silica forming less than 19% and the ratio of silica to alumina and iron oxid being less than 1.65, the ratio of alumina to iron oxid being less than 1.65, and the ratio of iron oxid to alumina being less than 1.65.

5. The process of making a special cement with high initial strength, consisting in increasing the alumina content of Portland cement and preventing the resulting tendency toward quick-setting by increasing the iron oxid content to bring the ratio of silica to alumina and iron oxid less than 1.8, the ratio of alumina to iron oxid less than 1.8, and the ratio of iron oxid to alumina less than 1.8 and keeping the percentage of silica not over 19%.

6. A sintered cement having lime, silica, alumina and iron oxid with the following limits: ratio of lime to silica, alumina and iron oxid more than 1.8; ratio of silica to alumina and iron oxid less than 1.8; ratio of alumina to iron oxid less than 1.8 and ratio of iron oxid to alumina less than 1.8.

7. The sintered cement having high initial strength and including lime, silica, alumina and oxid; the ratio of lime to silica, alumina and iron oxid being more than 1.7, the ratio of silica to alumina and iron oxid being less than 1.65; the ratio of alumina to iron oxid being less than 1.65 and the ratio of iron oxid to alumina being less than 1.65.

Signed at Berlin in the county of Brandenburg and State of Prussia this 6th day of February A. D. 1925.

Dr. HANS KÜHL.